United States Patent Office 3,472,666
Patented Oct. 14, 1969

3,472,666
CORROSION INHIBITOR
Zisis Andrew Foroulis, Morristown, N.J., assignor to Esso Research and Engineering Company, a corporation of Delaware
No Drawing. Filed Oct. 19, 1966, Ser. No. 587,665
Int. Cl. C23f 11/04; C09d 5/08
U.S. Cl. 106—14                 9 Claims This invention pertains to a method for minimizing or inhibiting corrosion. More particularly, this invention pertains to the prevention of corrosion of metals which are exposed to acid containing corrosive solutions. More particularly still, this invention pertains to a method for minimizing or inhibiting corrosion which occurs in the petroleum, petrochemical, chemical and related processing industries. This would encompass corrosion which is the result of the refining of crude oil, various chemical reactions and the shipping of various petroleum and other potentially corrosive compounds. The corrosion is prevented by adding an organic compound containing at least one benzene ring to which an alkoxyl group and an amine group is attached directly. More particularly, the inhibitor utilized will be anisidine, phenetidine or derivatives thereof.

It is well known that various organic and inorganic materials when found in solution or in the vapor phase cause extensive damage to metallic surfaces with which they come in contact. Examples of especially destructive inorganic compounds include HCl, $H_2SO_4$, and $H_3PO_4$. With respect to organic compounds, acetic acid, phenolic solutions, naphthenic acid, dimethylsulfoxide, dimethylformamide, etc. have all been known to be extremely troublesome. A great deal of money and effort is dissipated every year trying to combat the effect of this corrosion. The various metals which are utilized differ to a great extent with respect to their ability to withstand these corrosive compounds. Unfortunately, carbon steel, an extremely widely used material is quite susceptible to the corrosive effects of these various corrosive agents. In general, corrosive materials fall within the bounds of Brönsted acids. These are compounds which are capable of donating one or more protons.

The petroleum industry, in particular, has suffered greatly in loss of equipment and time because of the presence of these various corrosion-causing compounds. Most crude petroleums contain numerous naturally occurring constituents and impurities which will severely corrode the metals from which conventional petroleum refining equipment is constructed. This, of course, is predominantly carbon steel. The corrosive or corrosion-causing materials are varied in complexity and composition. Among the more troublesome corrosive agents is hydrogen sulfide, which is dissolved both in crude oil and in any water which is found within the system. Needless to say, hydrochloric acid is particularly destructive and this too is found in substantially all petroleum systems. A major source of the hydrochloric acid is its generation by the high temperature hydrolysis, i.e., 200° F. of magnesium and calcium chlorides which are contained in the water phase of crude oil. Additionally, extensive corrosion is encountered in process equipment which is used in chemical reactions. Thus, if any of the reactants, catalysts or products involved are corrosive, the efficiency of production is sharply reduced. The reaction must periodically be stopped in order to replace worn equipment; on occasion, corrosion may take place in such a fashion as to be substantially unnoticed and in those instances disastrous equipment failures may take place.

Another area where corrosion is becoming particularly troublesome is in the shipping or storage of crude oils and other corrosive materials such as refinery products, fertilizer solutions, petrochemicals and chemicals containing acidic materials. Shipping these materials in cargo ships has resulted in the pitting of the interior of the vessel. Prolonged exposure to these corrosive materials may result in deterioration of the hull of the ship with disastrous consequences. This, of course, will also be the case for any container used for small or large scale storage of liquids which contain corrosive agents.

Various attempts have been made in the prior art to derive inhibitors which would prevent this corrosion. It is well known to make use of inhibitors such as aniline, which has achieved some degree of limited success; however, substantial corrosion still takes place when aniline, for example, is used as a corrosion inhibitor.

According to this invention, it has unexpectedly been discovered that a particularly effective corrosion inhibitor is formed when alkoxyl and amino groups are attached directly to a benzene ring. Two or more condensed aromatic rings may be attached to one another so long as at least one ring has an alkoxyl and an amino group attached directly to it. In particular, methoxy and ethoxy groups are the preferred alkoxyl groups to be utilized. However, alkoxyl groups containing 1 to 10 carbon atoms are operative. When a methoxy group is utilized, the product is known as anisidine; when an ethoxy group is to be utilized, the product is known as phenetidine. Para and ortho-phenetidine and anisidine produce superior results to meta-phenetidine or meta-anisidine. Derivatives of anisidine and phenetidine in which alkyl groups having $C_1$ to $C_{10}$ length are attached to the benzene ring will also produce effective results. Hydroxyl groups directly attached to the benzene ring should be avoided because their presence may lead to formation of quinonimine or benzoquinone derivatives in the presence of oxidizing environments. This might result in the partial or complete deactivation of the corrosion inhibitor. However, groups such as methyl, ethyl, etc., may be attached to the benzene rings although the preferred embodiment would only have alkoxyl and amino groups attached directly to the benzene ring.

The following explanation is offered for the effectiveness of the instant invention. There is no intention to be bound by any particular mechanism and the mechanism offered is merely for the purposes of clarity. It is known that a benzene ring is an excellent carrier of electrons. The nitrogen of the amino group makes direct contact with the metal surface whose corrosion is intended to be limited. The greater the electron density around the nitrogen, the stronger the bond which is formed between the nitrogen and the metal. This bond between the nitrogen and metal is essential to prevent the corrosion of the metal itself. The alkoxyl group which is preferably an ethoxy or methoxy group acts as an excellent electron donor and thus increases the electron density in the amino group. In fact, the alkoxyl group presents an extremely prolific source of electrons and consequently an unexpected strength is achieved by the nitrogen group which has made contact with the metallic surface whose corrosion is intended to be limited.

In addition, the alkoxyl group increases the stability of the molecule toward mild oxidizing media and thus the inhibitor molecule will not be readily converted to the quinonimine or benzoquinone structure when in use. Formation of quinonimine or benzoquinone structures are undesirable because they are inert and do not exhibit corrosion inhibition properties.

The acids which may be inhibited by the instant invention include the organic acids such as acetic acid, naphthenic acid, organic acid halides, nonaqueous solutions such as formamide, dimethylsulfoxide, etc. The various inorganic acids are also corrosive and the presence of the alkoxides of the instant invention, i.e., phenetidene and anisidine, also serves to inhibit metallic corrosion caused by these inorganic acids. Examples of these inorganic acids include hydrochloric acid, sulfuric acid, nitric acid, sulfurous acid, hydrofluoric acid, fumaric acid, citric acid, succinic acid, perchloric acid, polyphosphoric acid, etc.

The metals which may be protected from corrosion by the process of the instant invention include carbon steel, nickel steel, copper and its alloys, stainless steels, etc. However, it should be emphasized that this invention will be most useful in preventing the corrosion of carbon steel, particularly as it is used in storage and refinery facilities such as transfer lines, pipestills, the various process vessels as well as ships and pipelines.

A further area where this invention would be applicable is the general field of chemical reactions wherein at least one of the reactants, catalysts or products is corrosive in nature. This would include acid catalyzed reactions, reactions of an acid with another reactant and reactions wherein an acid is formed either as the main product or a secondary product. Reactions such as these, when carried out on a large scale or under pressure, often take place in carbon steel vats as well as other metallic vessels which may be subjected to the corrosive attack of any of the various enumerated acidic materials. A particularly good example of a reaction wherein corrosion is an acute problem is alkylation, particularly in the formation of isooctane. The additive of the instant invention is substantially unreactive with most reactants, catalysts or products, and so as a rule does not interfere with the reaction itself. Another particularly useful embodiment of the instant invention would involve the injection of the inhibitor of the instant invention into a overhead pipestill which is used in the distillation of crude oil.

Any compound wherein an alkoxyl group and an amine are attached directly to a benzene ring, is intended to be included in the instant invention. The preferred alkoxyl groups are the methyl and ethyl groups which forms compounds called anisidine and phenetidine. Ortho, meta and para positions are acceptable for the instant invention. The preferred positions are the para and ortho configurations. The most preferred corrosion inhibitors of the instant invention are para and ortho phenetidine and anisidine.

With respect to concentration of the instant inhibitors, $1 \times 10^{-5}$ moles to $1 \times 10^{-1}$ moles per liter of corrosive solution may be used. Preferably $5 \times 10^{-3}$ moles to $1 \times 10^{-1}$ moles may be utilized and most preferably $1 \times 10^{-2}$ moles to $1 \times 10^{-1}$ moles per liter of corrosive solution may be added. The exact amount will be a function of the particular solution and may be determined by one skilled in the art. The compound containing a benzene ring with alkoxyl and amino groups attached directly to it may be added directly into the solution and mixed by conventional stirring means.

The instant invention may be used to prevent corrosion at temperatures of 0° to 350° F. It is effective above 200° F., a temperature where corrosion inhibitors have been extremely ineffective in the past.

EXAMPLE 1

This example illustrates the effectiveness of phenetidine to control corrosion in severe corrosive environments. The protective properties of the inhibitor were evaluated by immersing 1020 carbon steel test panels in HCl solution. The HCl was 0.1 normal (pH=1.0). The temperature of the solution was 25° C.

TABLE I.—PROTECTIVE PROPERTIES OF PHENETIDINES TO CONTROL CORROSION OF 1020 CARBON STEEL

| Inhibitor Concentration, Moles of Inhibitor/Liter of Solution | Corrosion Rate (m.d.d.) mgr./dec.$^2$/day | Percent Inhibitor Efficiency |
|---|---|---|
| Blank | 1,168 | |
| o-Phenetidine $1 \times 10^{-1}$ m./l | 17.5 | 98.5 |
| p-Phenetidine $1 \times 10^{-1}$ m./l | 33.8 | 97.3 |

The above table, Table I, indicates that ortho-phenetidine and para-phenetidine bring extraordinary results when one is desirous of controlling the corrosion of carbon steel. As indicated above, inhibitor efficiency as high as 98.5% was achieved when using ortho-phenetidine.

TABLE II.—PROTECTIVE PROPERTIES OF m-ANISIDINE TO CONTROL CORROSION OF 1020 CARBON STEEL IN 0.1 N NCl

| Inhibitor Concentration, Moles of Inhibitor/Liter of Solution | Corrosion Rate (m.d.d.) mgr./dec.$^2$/day | Percent Inhibitor Efficiency |
|---|---|---|
| Blank | 1,168 | |
| m-Anisidine $1 \times 10^{-5}$ m./l | 1,005 | 14.0 |
| m-Anisidine $1 \times 10^{-4}$ m./l | 839 | 28.2 |
| m-Anisidine $5 \times 10^{-3}$ m./l | 660 | 43.5 |
| m-Anisidine $1 \times 10^{-2}$ m./l | 494 | 57.7 |
| m-Anisidine $1 \times 10^{-1}$ m./l | 24.3 | 98.0 |

TABLE III.—PROTECTIVE PROPERTIES OF P-ANISIDINE TO CONTROL CORROSION OF 1020 CARBON STEEL IN 0.1 N NCl

| Inhibitor Concentration, Moles of Inhibitor/Liter of Solution | Corrosion Rate (m.d.d.) mgr./dec.$^2$/day | Percent Inhibitor Efficiency |
|---|---|---|
| Blank | 1,168 | |
| p-Anisidine $1 \times 10^{-5}$ m./l | 987 | 15.5 |
| p-Anisidine $1 \times 10^{-4}$ m./l | 804 | 31.2 |
| p-Anisidine $5 \times 10^{-3}$ m./l | 708 | 39.4 |
| p-Anisidine $1 \times 10^{-2}$ m./l | 476 | 59.2 |
| p-Anisidine $1 \times 10^{-1}$ m./l | 49.4 | 95.7 |

TABLE IV.—PROTECTIVE PROPERTIES OF o-ANISIDINE TO CONTROL CORROSION OF 1020 CARBON STEEL IN 0.1 N HCl (pH=1.0), 25° C.

| Inhibitor Concentration, Moles of Inhibitor/Liter of Solution | Corrosion Rate (m.d.d.) mgr./dec.$^2$/day | Percent Inhibitor Efficiency |
|---|---|---|
| Blank | 1,168 | |
| o-Anisidine $1 \times 10^{-1}$ m./l | 26.1 | 97.2 |

Tables II, III and IV indicate the increasing efficiency of anisidine when utilized as a corrosion inhibitor. Relatively small amounts such as $1 \times 10^{-2}$ m./l. produce over 50% inhibition of corrosion.

EXAMPLE 2

The below table, Table V, illustrates that aniline was not nearly so effective in controlling the corrosion of 1020 carbon steel under exactly the same conditions.

TABLE V.—PROTECTIVE PROPERTIES OF ANILINE TO CONTROL CORROSION OF 1020 CARBON STEEL IN 0.1 N HCl (pH=1.0), 25° C.

| Inhibitor Concentration, Moles of Inhibitor/Liter of Solution | Percent Inhibitor Efficiency |
|---|---|
| Aniline $1 \times 10^{-4}$ m./l | 7.6 |
| Aniline $5 \times 10^{-3}$ m./l | 21 |
| Aniline $1 \times 10^{-2}$ m./l | 34 |
| Aniline $1 \times 10^{-1}$ m./l | 88.4 |

From the above, it is seen that aniline in concentrations of $1 \times 10^{-1}$ moles per liter produces an inhibitor efficiency of only 88.4%. This represents a considerably lower degree of success than that which was accomplished with phenetidines or anisidines in the same concentration. The difference is even more pronounced at the $1 \times 10^{-2}$ m./l. level where the efficiency of aniline was only 34% compared to levels of 59.2% and 57.7% for anisidine.

EXAMPLE 3

TABLE VI.—PROTECTIVE PROPERTIES OF PARA AND META NITROANILINE TO CONTROL CORROSION OF 1020 CARBON STEEL IN 0.1 N HCl (pH=1.0), 25° C.

| Inhibitor Concentration, Moles of Inhibitor/Liter of Solution | Percent Inhibitor Efficiency |
|---|---|
| m-Nitroaniline $1 \times 10^{-5}$ m/l | 19.3 |
| m-Nitroaniline $1 \times 10^{-4}$ m/l | 31.3 |
| m-Nitroaniline $5 \times 10^{-3}$ m/l | 18.7 |
| m-Nitroaniline $1 \times 10^{-2}$ m/l | −28.8 |
| m-Nitroaniline $1 \times 10^{-1}$ m/l | −29.3 |
| p-Nitroaniline $1 \times 10^{-5}$ m/l | 15.5 |
| p-Nitroaniline $1 \times 10^{-4}$ m/l | 22.4 |
| p-Nitroaniline $5 \times 10^{-3}$ m/l | −10.8 |
| p-Nitroaniline $1 \times 10^{-2}$ m/l | −55.5 |

*Negative number for percent inhibitor efficiency indicates acceleration of corrosion.

The above table, Table VI, illustrates that nitroaniline is far more inefficient than either phenetidine or anisidine which are typical of groups having both alkoxyl and amine groups attached directly to a benzene ring. It is seen that increasing the concentration of nitroaniline serves to reduce the efficiency realized; in certain instances, a negative efficiency was in fact realized since the corrosion was accelerated rather than decreased.

Although this invention has been described with some degree of particularity, it is intended to be limited only by the attached claims.

What is claimed is:

1. A method for preventing the corrosion of metallic surfaces when in contact with a liquid containing at least one corrosive agent capable of corroding said metal which comprises incorporating into said liquid an alkoxy substituted aromatic amine in which the alkoxy group contains 1 to 10 carbon atoms and in which said alkoxy group and the amino group are attached directly to the same benzene ring and thereby substantially inhibiting said corrosion.

2. The process of claim 1 wherein said metal is carbon steel.

3. The process of claim 2 wherein said corrosive liquid contains hydrochloric acid.

4. The process of claim 1 wherein said corrosive liquid contains a corrosive acid selected from the group consisting of Brönsted acids.

5. The process of claim 1 wherein said corrosion inhibitor is selected from the group consisting of phenetidine and anisidine.

6. A process for preventing the corrosion of carbon steel when in contact with a liquid containing a corrosive agent which comprises adding, as a corrosion inhibitor, $5 \times 10^{-3}$ to $10^{-1}$ moles of an alkoxy substituted aromatic amine in which the alkoxy group contains 1 to 10 carbon atoms and in which said alkoxy group and the amino group are attached directly to the same benzene ring, per liter of corrosive liquid, whereby the corrosion effects of said liquid are substantially inhibited.

7. The process of claim 6 wherein said corrosion inhibitor is phenetidine.

8. The process of claim 6 wherein said corrosion inhibitor is anisidine.

9. The process of claim 6 wherein said corrosive agent is HCl.

References Cited

UNITED STATES PATENTS

| | | | |
|---|---|---|---|
| 2,606,873 | 8/1952 | Cardwell et al. | 252—148 |
| 2,788,329 | 4/1957 | Yost | 252—390 |
| 3,062,612 | 11/1962 | Le Boucher | 21—2.5 |
| 3,240,714 | 3/1966 | Rai et al. | 252—148 |
| 3,245,915 | 4/1966 | Rai et al. | 252—390 XR |

JULIUS FROME, Primary Examiner

L. HAYES, Assistant Examiner

U.S. Cl. X.R.

252—79.4, 390, 394